United States Patent
Sugiyama et al.

[11] Patent Number: 5,982,969
[45] Date of Patent: Nov. 9, 1999

[54] OPTICAL TRANSMISSION TUBE, MAKING METHOD, AND LINEAR ILLUMINANT SYSTEM

[75] Inventors: Hideo Sugiyama, Higashimurayama; Masato Sugimachi, Kodaira; Minoru Ishiharada, Urawa; Yasuhiro Morimura, Kodaira; Tatsuo Terahama, Tokyo; Hiroshi Fukuyama, Higashimurayama; Itsuo Tanuma, Sayama, all of Japan

[73] Assignee: Bridgestone Corporation, Tokyo, Japan

[21] Appl. No.: 09/065,604

[22] Filed: Apr. 24, 1998

[30] Foreign Application Priority Data

Apr. 24, 1997 [JP] Japan .................................... 9-121676
Aug. 22, 1997 [JP] Japan .................................... 9-241892

[51] Int. Cl.⁶ ........................................................ G02B 6/02
[52] U.S. Cl. ........................... 385/123; 385/125; 385/141; 385/901; 362/554; 362/560
[58] Field of Search .................................... 385/123, 125, 385/147, 141, 900, 901; 362/554, 556, 560

[56] References Cited

U.S. PATENT DOCUMENTS

| 4,422,719 | 12/1983 | Orcutt ................................. | 385/901 X |
| 4,666,640 | 5/1987 | Neefe ....................................... | 264/2.1 |
| 4,733,332 | 3/1988 | Yamashita et al. ................. | 362/554 X |
| 4,806,289 | 2/1989 | Laursen et al. ............................ | 264/1.5 |
| 5,799,124 | 8/1998 | Zorn et al. ................................ | 385/125 |

FOREIGN PATENT DOCUMENTS

| 0 131 058 A1 | 1/1985 | European Pat. Off. . |
| 1 0800036 | 10/1997 | European Pat. Off. . |
| WO 9820279 | 5/1998 | WIPO . |

OTHER PUBLICATIONS

Controllable Lighting Effects Using Polymer Optical Fibers, *Research Disclosure*, No. 388, Aug. 1996, p. 516, XP 000635449.

*Primary Examiner*—Phan T. H. Palmer
*Attorney, Agent, or Firm*—Sughrue, Mion, Zinn, Macpeak & Seas, PLLC

[57] ABSTRACT

In an optical transmission tube comprising a tubular cladding and a core within the cladding having a higher index of refraction than the cladding, a strip-shaped reflecting layer is longitudinally extended between the cladding and the core. Light passing through the core is reflected and scattered by the reflecting layer to emerge from the tube through an area of the outer surface of the cladding opposed to the reflecting layer. The optical transmission tube is prepared by dispersing scattering particles in a monomer solution; filling a tubular cladding with the monomer solution; resting the cladding horizontally for allowing the scattering particles to settle on a lower inner surface of the cladding; and thereafter, causing the monomer solution to polymerize and solidify within the cladding.

11 Claims, 8 Drawing Sheets

OPTICAL TRANSMISSION TUBE, MAKING METHOD, AND LINEAR ILLUMINANT SYSTEM

BACKGROUND OF THE INVENTION

1. Field of the Invention

This invention relates to an optical transmission tube comprising a tubular transparent cladding and a transparent core having a higher index of refraction than the cladding and a method for preparing the same. More particularly, it relates to an optical transmission tube allowing directional light emergence from one side or outer surface area of the cladding. It also relates to a linear illuminant system having improved water resistance, improved environmental resistance and a low power consumption for driving.

2. Prior Art

Since optical transmission tubes comprising a tubular cladding and a core in the cladding having a higher index of refraction than the cladding are generally designed so as to transmit as much light as possible from one end to the other end thereof, only a low luminance is generally available near the side surface of the tube. One possible measure for increasing the luminance at the side surface of an optical transmission tube is by corrugating the cladding inner surface for scattering light. This measure is difficult to apply to the method for producing an optical transmission tube by filling a tubular cladding with a core-forming polymerizable monomer liquid and pressurizing the liquid for causing the monomer to polymerize because the cladding becomes likely to rupture.

It may also be envisaged to disperse scattering particles in the core for increasing the luminance at the side surface of an optical transmission tube. It may occur to those skilled in the art to disperse scattering particles in a monomer liquid and then polymerize and solidify the monomer. However, there has never been available a method of adding scattering particles to a monomeric liquid and polymerizing the liquid in a controlled manner such that the scattering particles are distributed in a limited area, that is, to form a reflecting layer, at the end of polymerization.

Known illuminant devices capable of providing linear light emission over a length of several meters include neon tubes and fluorescent tubes. The neon tubes and fluorescent tubes require high voltages, with the risk of electric shocks and leakage. They cannot be used in water and at places where rain or snow reaches. Since the tubes are formed of glass, they cannot be used at places where failure of glass tubes by physical collision of people or vehicles is expectable.

Where the neon tubes and fluorescent tubes are used in a bent form, the glass tubes must be worked to the desired curvature, which requires skilled workers and hence, leads to an increased cost. The power consumption of neon tubes and fluorescent tubes is as high as several tens of watts per meter. For a long term of operation, they must be installed where a commercial power supply is available.

To solve these problems, optical transmission tubes in the form of a flexible tube filled with a transparent core liquid or flexible transparent polymer and strands of plastic optical fibers have been proposed. The system includes a light source and an optical transmission tube which receives light from the light source at one end thereof. The optical transmission tube is designed such that light may emerge from a side surface area of the tube over a length of several tens of meters. Since the light source can be separated from the light emerging area, this system can be used in water, outdoor or even in an environment with the risk of explosion. The system is free of the risk of breakage, eliminates complex cumbersome working such as glass working, and is readily applied at a necessary site.

These optical transmission tubes provide light emergence over a length of several tens of meters. Since the light emergent efficacy at the side surface is low, a high power light source of about 50 to 250 W is required in order to provide an increased luminance. When such an optical transmission tube is used in water, outdoor or in an environment with the risk of explosion for the purpose of providing side surface light emergence, a means for protecting the light source is necessary. As a consequence, the light source is increased in size and its accommodation is significantly limited.

SUMMARY OF THE INVENTION

An object of the invention is to provide an optical transmission tube allowing directional emergence of light from one side or an outer surface area thereof at a high luminance.

Another object of the invention is to provide a method for preparing the optical transmission tube.

A further object of the invention is to provide a linear illuminant system which can be used in water, at places where rain or snow reaches, or in an environment with the risk of explosion, which requires only a low power to produce sufficient side light emergence, and which is compact so that it may be installed at any desired place.

In a first aspect, the invention provides an optical transmission tube comprising a tubular cladding having an outer surface and a core within the cladding having a higher index of refraction than the cladding. A reflecting layer in a strip form extends between the cladding and the core and longitudinally of the cladding. Light passing through the core is reflected and scattered by the reflecting layer to exit from the tube through an area of the outer surface of the cladding that is opposed to the reflecting layer.

In a second aspect, the invention provides a method for preparing an optical transmission tube, comprising the steps of dispersing scattering particles in a core-forming solution comprising a monomer capable of forming a core upon polymerization; filling a tubular cladding with the scattering particle-dispersed core-forming solution; resting the tubular cladding horizontally for allowing the scattering particles to settle on a lower inner surface of the cladding; and thereafter, causing the core-forming solution to polymerize and solidify within the cladding, thereby forming a solid core within the cladding and forming a reflecting layer composed of the scattering particles in a strip form extending between the cladding and the core and longitudinally of the cladding.

In a third aspect, the invention provides a method for preparing an optical transmission tube using a three-color extruder having three screw sections and two concentric dies. A core material, a cladding material, and a reflecting material loaded with a white pigment or scattering agent are simultaneously fed into the extruder from its inlet. The core material is extruded into a cylindrical core. The reflecting material is extruded into a strip-shaped reflecting layer on the outer surface of the cylindrical core. The cladding material is extruded into a tubular cladding enclosing the core and the reflecting strip, thereby forming the optical transmission tube having the strip-shaped reflecting layer extending between the cladding and the core and longitudinally of the cladding.

In the optical transmission tube of the invention, the reflecting layer in a strip form is disposed between the cladding and the core and extended longitudinally of the cladding. Intense light passing through the core providing the maximum light quantity is reflected by the elongated strip-shaped reflecting layer and the reflected light emerges from the tube through an area of the outer surface of the cladding opposed to the reflecting layer. (It is noted that since the quantity of light passing through the cladding is small, the reflected light thereof is very weak.) Intense light exits from the opposed outer surface area of the tube with a high directivity and at a high luminance, establishing a brightly illuminated state. In the place where the optical transmission tube is disposed, the elongated one side surface area of the tube is brightly illuminant. In one embodiment wherein the reflecting layer is constructed of scattering particles such as silicone resin particles, polystyrene resin particles and metal oxide particles, the tube produces highly directional light emergence having a high luminance. In another preferred embodiment, a metal sheet or a reflective coating having scattering particles dispersed therein is formed on the outer surface of the cladding so as to surround the reflecting layer between the cladding and the core. Even when the reflecting layer has defects such as pinholes, light leaking through the defects in the reflecting layer to the rear side thereof and light laterally escaping outside the reflecting layer are reflected by the reflective coating back to the opposed area. This further increases the luminance of light emergent from the opposed area (opposed to the reflecting layer) and significantly reduces the loss of light.

The method of the invention ensures that the strip-shaped reflecting layer is formed in a very simple manner. Then the optical transmission tube adapted to emit highly directional light at a high luminance from its one side surface area can be easily prepared.

In a third aspect, the invention provides a linear illuminant system comprising a light transmission tube including a transparent core and a cladding having a lower index of refraction than the core and serving as a light emergent element, a light source coupled to at least one end of the light transmission tube in a water-proof manner, and a drive means for operating the light source. The light transmission tube is constructed such that when light emitted from the light source is transmitted by the light transmission tube, light emerges from a longitudinal side of the light transmission tube. The preferred light transmission tube has a reflecting layer in a strip form extending between the cladding and the core and longitudinally of the cladding.

DETAILED DESCRIPTION OF THE INVENTION

Figure 1:
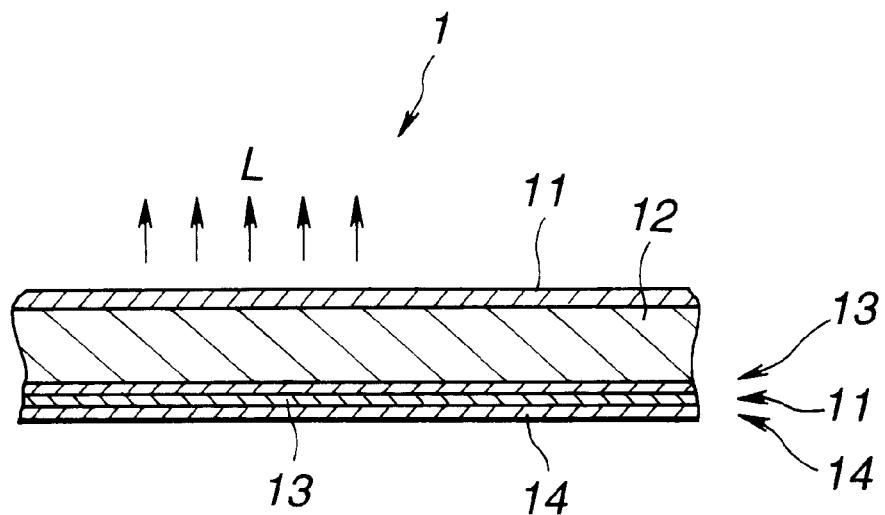
FIG. 1 is a fragmental axial cross-sectional view of one exemplary optical transmission tube according to one embodiment of the invention.
Figure 2:
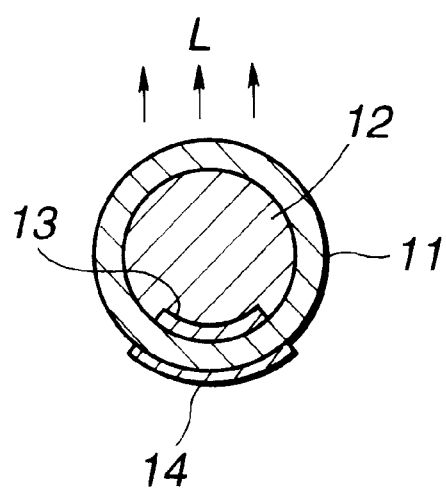
FIG. 2 is a radial cross-sectional view of the optical transmission tube of FIG. 1.

Referring to FIGS. 1 and 2, an optical transmission tube 1 according to the invention is illustrated as comprising a tubular transparent cladding 11 having inner and outer surfaces and a transparent core 12 coaxially disposed within the cladding 11. The core 12 has a higher index of refraction than the cladding 11. A reflecting layer 13 in a strip form is disposed between the cladding 11 and the core 12. The strip form means that the reflecting layer 13 extends longitudinally of the cladding 11 as viewed in the axial cross section of FIG. 1 and extends an arcuate as viewed in the radial cross section FIG. 2. That is, the reflecting layer 13 extends only a part of a circle on one side of the tube as viewed in the radial cross section of FIG. 2. The reflecting layer 13 may have a certain thickness extending from the core surface toward the interior as shown in FIG. 2. With this construction, light passing through the core 12 is reflected and scattered by the reflecting layer 13 and emerges from the tube through an area of the outer surface of the cladding 11 that is approximately diametrically opposed to the reflecting layer 13, as shown by arrows L. Since the reflecting layer 13 is disposed at the one or bottom side in FIG. 2, the opposed area from which the reflected light emerges is the other or top side of the tube.

In one preferred embodiment, a reflective protective layer 14 is disposed on the one side or bottom surface of the cladding 11 so as to circumferentially and longitudinally surround the reflecting layer 13.

When a first preparation method to be described later is employed, the tubular cladding is preferably constructed of flexible materials which are moldable into a tubular form and have a low index of refraction, such as plastics and elastomers. Illustrative examples of such flexible materials include polyethylene, polypropylene, polyamides, polystyrene, ABS resins, polymethyl methacrylate, polycarbonate, polyvinyl chloride, polyvinylidene chloride, polyvinyl acetate, polyethylene-vinyl acetate copolymers, polyvinyl alcohol, polyethylene-polyvinyl alcohol copolymers, fluoro-resins, silicone resins, natural rubber, polyisoprene rubber, polybutadiene rubber, styrene-butadiene copolymers, butyl rubber, halogenated butyl rubber, chloroprene rubber, acrylic rubber, EPDM, acrylonitrile-butadiene copolymers, fluoro-rubber, and silicone rubber.

Of these, silicone polymers and fluorinated polymers having a low index of refraction are preferred. Exemplary silicone polymers include polydimethylsiloxane polymers, polymethylphenylsiloxane polymers, and fluorosilicone polymers; and exemplary fluorinated polymers include polytetrafluoroethylene (PTFE), tetrafluoroethylene-hexafluoropropylene copolymers (FEP), tetrafluoroethylene-perfluoroalkoxyethylene copolymers (PFE), polychloro-trifluoroethylene (PCTFE), ethylene-tetrafluoroethylene copolymers (ETFE), polyvinylidene fluoride, polyvinyl fluoride, vinylidene fluoride-trifluorochloroethylene copolymers, vinylidene fluoride-hexafluoropropylene copolymers, vinylidene fluoride-hexafluoropropylene-tetrafluoroethylene terpolymers, tetrafluoroethylene-propylene rubber, and fluorinated thermoplastic elastomers. The fluorinated polymers are especially preferred. These materials may be used alone or in admixture of two or more.

The core materials are preferably solid. Examples include (meth)acrylic polymers, polycarbonate, ethylidene-norbornene polymers, SBS, SIS, and SEBS (styrene-ethylene-butadiene-styrene block polymers), with the (meth)acrylic polymers being preferred.

The (meth)acrylic polymers include homopolymers resulting from polymerization of a monomer selected from acrylic acid, methacrylic acid, and esters thereof with monohydric alcohols, and copolymers resulting from copolymerization of two or more monomers. The monohydric alcohols are those having 1 to 22 carbon atoms. In particular, copolymers of a monomer selected from acrylic acid, methacrylic acid, and esters thereof with lower alcohols of 1 to 5 carbon atoms, preferably 1 to 3 carbon atoms, most preferably one carbon atom, with a monomer of the following general formula (1) are preferred because they are well flexible or soft and light transmissive.

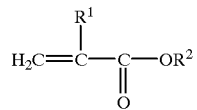

(1)

In formula (1), $R^1$ is a hydrogen atom or methyl group, and $R^2$ is an alkyl group of 8 to 20 carbon atoms, preferably 10 to 16 carbon atoms, more preferably 12 to 14 carbon atoms. The higher alkyl group represented by $R^2$ may be a single alkyl group or a mixture of alkyl groups, and most preferably a mixture of alkyl groups of 12 and 13 carbon atoms. The ratio of the alkyl group of 12 carbon atoms to the alkyl group of 13 carbon atoms is preferably from 20:80 to 80:20 by weight, and more preferably from 40:60 to 60:40 by weight. The proportion of the monomer selected from acrylic acid, methacrylic acid and lower alcohol esters thereof and the monomer of formula (1) to be copolymerized is preferably from 5:95 to 79:21, and more preferably from 30:70 to 65:35 in weight ratio.

The diameter of the core is generally 2 to 30 mm, preferably 4 to 15 mm, though not critical.

The reflecting layer is preferably constructed of scattering particles, that is, particles capable of scattering light. Exemplary scattering particles include organic polymer particles such as silicone resin particles and polystyrene resin particles, metal oxide particles such as $Al_2O_3$, $TiO_2$ and $SiO_2$, sulfate particles such as $BaSO_4$, and carbonate particles such as $CaCO_3$, alone or in admixture of two or more.

Preferably the scattering particles have a mean particle size of 0.1 to 30 $\mu$m, especially 1 to 15 $\mu$m. Particles greater than 30 $\mu$m are sometimes disadvantageous when the optical transmission tube is prepared by the inventive method to be described later in detail because such larger particles tend to settle out during the step of introducing the core-forming liquid into the tubular cladding.

The thickness of the reflecting layer is preferably 10 to 200 $\mu$m, especially 50 to 100 $\mu$m, though not critical. A too thin layer would reflect a less amount of light, resulting in a low luminance. A too thick layer would reflect a more amount of light to provide a high luminance, but over a short distance from the light source, sometimes with the disadvantage of providing a lower luminance at positions remote from the light source.

When a second preparation method to be described later is employed, the core is preferably formed of polystyrene, polycarbonate, a styrene-(meth)acrylate copolymer (abbreviated as MS polymer) or the like, and the cladding having a lower index of refraction than the core is preferably formed of a (meth)acrylic polymer. Further, the reflecting layer is preferably formed of a (meth)acrylic polymer loaded with a white pigment or scattering agent. The (meth)acrylic polymers used herein are the same as the (meth)acrylic polymers described in conjunction with the first method, and examples of the white pigment and scattering agent are the same as the above-described scattering particles.

When light leaks through defects in the reflecting layer to the rear side thereof and light laterally escapes outside the reflecting layer, the reflective protective layer serves to reflect such leakage light back to the other side (or top side). The reflective protective layer may be a layer by which such leakage light is not transmitted, and preferably a layer which reflects such leakage light without absorbing it. Illustratively, the reflective protective layer may be a metal foil or sheet such as silver or aluminum, a reflective tape, a metallized tape, or a coating having dispersed therein light-scattering particles as described above.

Figure 3:
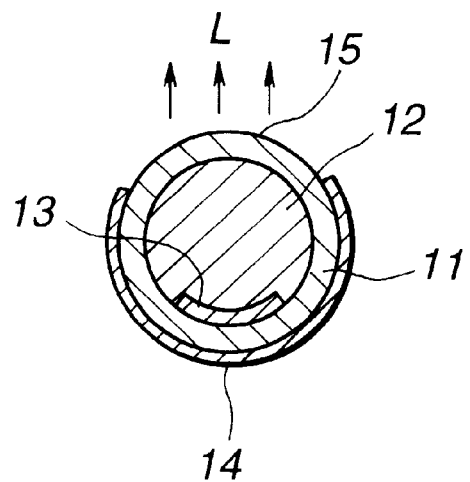
FIG. 3 is a radial cross-sectional view like FIG. 2, but showing an optical transmission tube according to another embodiment.

The protective layer 14 on the outer surface of the cladding 11 may have a circumferential width sufficient to span only the reflecting layer 13 as shown in FIG. 2. Alternatively, as shown in FIG. 3, the protective layer 14 may have a greater circumferential width to extend beyond the reflecting layer 13 toward the other side (or top side) and to leave the light emergent area 15 open.

The first method for preparing the optical transmission tube of the above-described construction according to the invention involves the steps of dispersing scattering particles in a core-forming solution comprising a monomer or monomers as described above, filling a tubular cladding with the particle-dispersed core-forming solution, closing the opposite ends of the cladding with plugs, and resting the tubular cladding horizontally for about ½ to 48 hours for allowing the scattering particles to settle on a lower inner surface of the cladding. Instead of horizontal resting, centrifugation may be carried out. Thereafter, with the particles kept settled, the monomer(s) is polymerized and cured within the cladding to thereby form a solid core within the cladding. At the same time, a reflecting layer composed of the scattering particles is formed in a strip form between the cladding and the core or in a shallow recess in the surface of the core.

In this method, the monomer polymerization technique is not critical although the common technique is by adding a polymerization initiator to the monomer(s) and heating at 50 to 120° C. for 1 to 20 hours for effecting polymerization. Exemplary polymerization initiators include organic peroxides such as t-butyl hydroperoxide, di-t-butyl peroxide, lauroyl peroxide, benzoyl peroxide, dimyristyl peroxydicarbonate, t-butyl peroxyacetate, t-butyl peroxy(2-ethylhexanoate), and cumyl peroxyoctoate, and azo compounds such as asobisisobutyronitrile and azobiscyclohexane nitrile. It is recommended that the core-forming solution is polymerized while it is pressurized from one end or both ends of the clad tubing, so that no bubbles are generated in the core.

The second method for preparing an optical transmission tube according to the invention uses a three-color extruder having three screw sections and two concentric dies. A core material, a cladding material, and a reflecting material loaded with a white pigment or scattering agent are simultaneously fed into the extruder from its inlet. The core material is extruded into a cylindrical core. The reflecting material is extruded into an axially extending strip-shaped reflecting layer on the outer surface of the cylindrical core. The cladding material is extruded into a tubular cladding enclosing the core and the reflecting strip. This results in the optical transmission tube in which the strip-shaped reflecting layer extends between the cladding and the core and longitudinally of the cladding.

The second method has the following advantages. A laminate structure having three functions can be molded all at once by co-extruding three materials having different indices of refraction or physical properties. The rate of molding is high. A firm bond is established between the respective layers since the layers are laminated in a softened state.

The optical transmission tube of the invention is to emit more light from its side surface area to provide a high luminance. The inventive method is effective for producing such an optical transmission tube.

Next, the linear illuminant system according to the invention is described.

Figure 4:
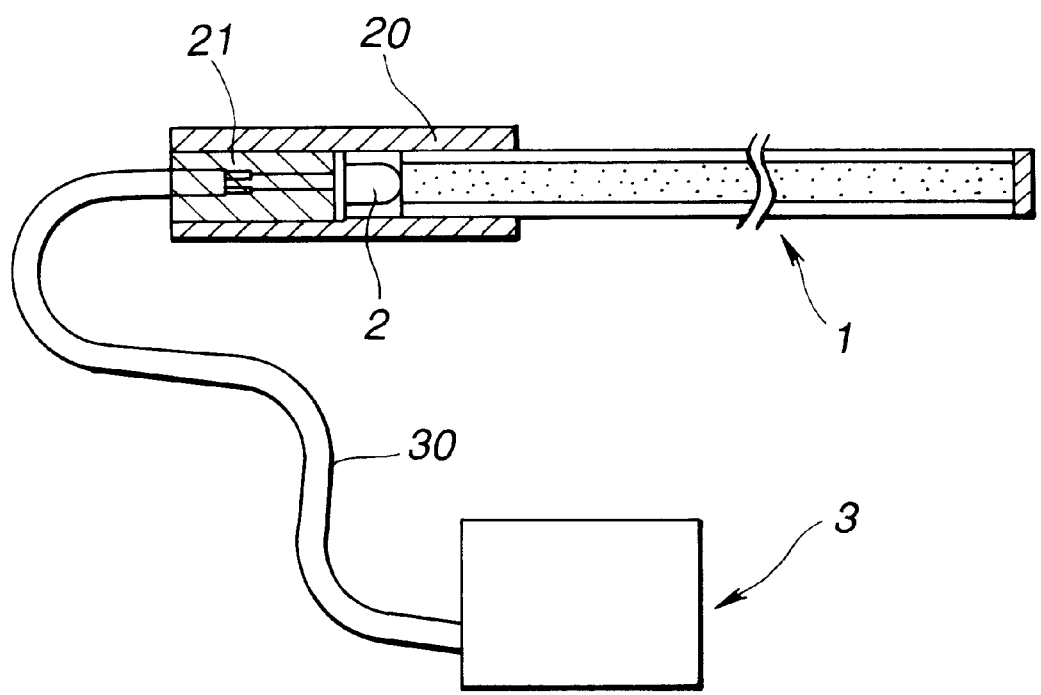
FIG. 4 schematically illustrates, partially in cross section, a linear illuminant system according to the invention.

Referring to FIG. 4, a linear illuminant system is illustrated as comprising a light transmission tube 1 serving as a light emergent element, a light source 2 coupled to one end of the light transmission tube 1, and a drive means 3 for operating the light source 2. The light transmission tube is constructed such that when light emitted from the light source is transmitted by the light transmission tube, light emerges from a longitudinal side of the light transmission tube.

The optical transmission tube 1 is constructed as shown in FIGS. 1 and 2, that is, includes a tubular transparent cladding 11, a transparent core 12 having a higher index of refraction than the cladding 11, and a strip-shaped reflecting layer 13 extending between the cladding 11 and the core 12 on one side. The tube 1 further includes a reflective protective layer 14 on the one side of the cladding 11 surrounding the reflecting layer 13, which is effective for increasing the reflection efficiency. The detail of the optical transmission tube is as described above.

The diameter and length of the core of the optical transmission tube are not critical. When a single LED is used as the light source 2, for example, the core has a diameter of about 2 to 30 mm, preferably 4 to 15 mm and a length of about 0.1 to 5 m, preferably about 0.2 to 2 m.

The light source 2 is coupled to at least one longitudinal end (the left end in the illustrated embodiment) of the optical transmission tube 1. It may be a light emitting diode (LED). Depending on the intended application, a choice may be made among LEDs emitting light of various colors such as red, blue, green, yellow, orange and white. With respect to the number of LEDs used, a single LED may be used, or plural LEDs may be used to increase the light quantity. The LED may be coupled to one end or both ends of the light tube. The embodiment wherein LEDs are coupled to both ends of the light tube provides more uniform linear light emergence at a high luminance. With respect to the emission color of LEDs, they may emit monochromatic light or a mixture of different colors. In one exemplary application where the linear illuminant system is installed at the stop line of a railroad crossing, the system having LEDs capable of emitting light of different colors may be designed such that the color of its light emission may be changed, for example, yellow light is normally emitted, but immediately before and during the passage of a train, red light is emitted to give warning to passersby. The LEDs may be continuously or intermittently operated.

With respect to the attachment structure, one end of the optical transmission tube 1 is fixedly secured to a tubular joint member 20 with an adhesive or by cramping. The light source 2 in the form of LED is received in the joint member 20 and integrally coupled to the end face of the optical transmission tube 1.

The light source 2 is electrically connected to the drive means 3 by a cord 30 with an insulating coat of rubber, vinyl resin or polyethylene. To provide insulation around the connection between the light source 2 and the cord 30, the joint member 20 is filled with a potting material 21 such as an epoxy resin or silicone rubber for preventing entry of water, water vapor, combustible gas or liquid. The cord 30 may be inserted in a flexible sheath of metal or resin or a rubber or plastic pipe for protection or water-proofness.

Figure 5:
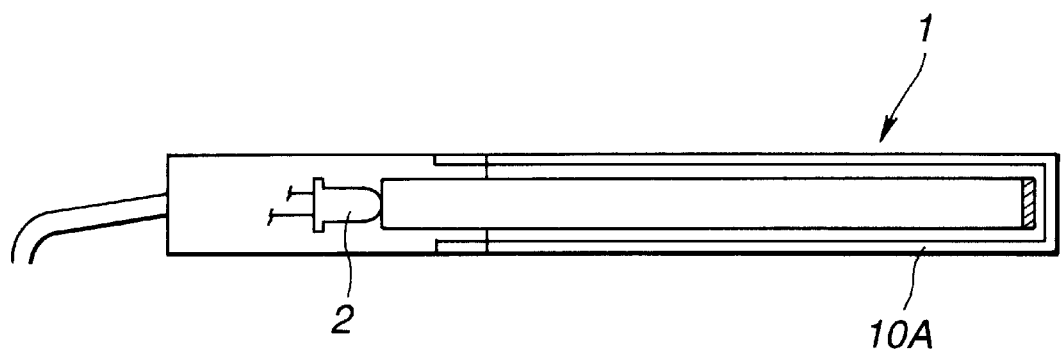
FIGS. 5 and 6 schematically illustrates optical transmission tubes according to further embodiments of the invention.
Figure 6:
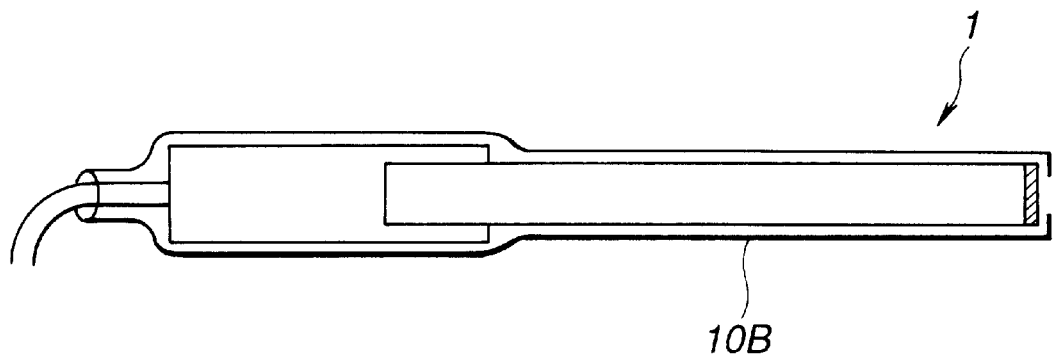

The structure of the optical transmission tube may be modified. For example, as shown in FIG. 5, the tube 1 may be inserted into a transparent resin pipe 10A for protection purpose. As shown in FIG. 6, the tube 1 and the joint member 20 may be enclosed with a transparent heat shrinkable tubing 10B which is heat shrunk into tight fit for protecting the tube 1 and providing a seal over the entire structure.

Figure 7:
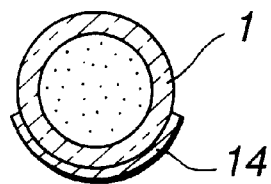
FIG. 7 is a radial cross-sectional view of an optical transmission tube with a reflective protective layer.
Figure 8:
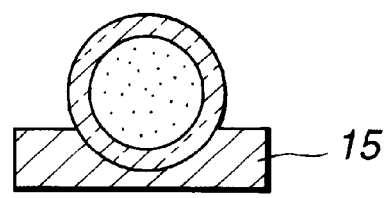
FIGS. 8 and 9 are radial cross-sectional views of optical transmission tubes attached to different channels.
Figure 9:
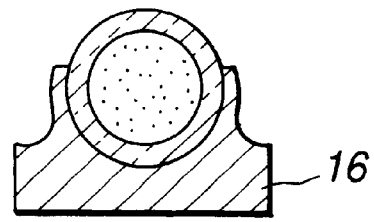

Further, as shown in FIG. 7, a light reflective layer 14 may formed on a (one side) portion of the outer surface of the optical transmission tube 1, for example, by attaching a reflective tape strip having a metal material such as stainless steel, gold or silver evaporated, sputtered or plated thereon, applying a reflective coating, attaching a metal foil, applying reflecting particles such as titanium oxide, or attaching a pigmented vinyl tape. Alternatively, a securing channel 15 or 16 may be attached to a (one side) portion of the outer surface of the optical transmission tube 1 as shown in FIGS. 8 and 9. If desired, the channel 15 or 16 is further given a reflecting function so that the channel may serve as a reflective protective layer. The channel 15 or 16 is usually formed of metal materials such as aluminum and stainless steel or plastic or elastomer materials loaded with highly reflective fine particles.

The drive means 3 for supplying electricity to the light source 2 includes a power supply (e.g., a battery, solar battery or DC/AC power supply) and an electric circuit (including resistors, transistors, constant current diodes, etc., for example) for converting the power into direct current for operating the LED. The solar battery or secondary battery may be incorporated in the drive means 3 or externally connected to the drive means 3. A suitable sealant is applied where the cord 30 is extended from the drive means 3, for providing water-proofness.

The linear illuminant system of the invention is of the construction comprising a light transmission tube including a transparent core and a cladding having a lower index of refraction than the core, and serving as a light emergent element, a light source coupled to at least one end of the light transmission tube in a water-proof manner, and a drive means for operating the light source, wherein the light transmission tube is constructed such that when light emitted from the light source is transmitted by the light transmission tube, light emerges from a longitudinal side of the light transmission tube. Differently stated, the light source is integrally coupled to the optical transmission tube in a water-proof manner so that the optical transmission tube and the light source may be disposed outdoor or in water, separately from the drive means. The linear illuminant system can be advantageously used in water, at places where rain or snow reaches, or in an environment with the risk of explosion. The system requires only a low electric power to produce sufficient side light emergence. The system is compact, and few restrictions are imposed on its installation site.

EXAMPLE

Examples of the invention are given below by way of illustration and not by way of limitation.

Example 1

A core-forming solution was prepared by mixing 60 parts by weight of methyl methacrylate (MMA), 40 parts by weight of lauryl methacrylate (LMA), and 0.05 part by weight of benzoyl peroxide (BPO) to form a monomer solution having a specific gravity of 0.92. In 100 parts by weight of the monomer solution were dispersed 0.15 part by weight of scattering particles which were silicone resin particles having a mean particle size of 7 $\mu$m and a specific gravity of 1.32 (commercially available from Toshiba K.K.) or polystyrene resin particles having a mean particle size of 10 $\mu$m and a specific gravity of 1.06 (commercially available from Sekisui Chemicals K.K.). This solution was fed into a FEP tube having an outer diameter of 6 mm and a length of 1.5 m, which was closed at both ends. The tube was rested on a horizontal table for 2 hours, allowing the particles to settle on a lower inner surface of the FEP tube. The tube was carefully transferred in a hot bath at 65° C. so that the particle deposit might remain intact. In the hot bath, while a pressure of 3.5 kg/cm$^2$ was applied from the opposite ends of the tube, the monomer solution was polymerized and solidified for 3 hours.

There was obtained an optical transmission tube in which a reflecting layer composed of the scattering particles extended in a strip form on the core surface and longitudinally of the tube.

The optical transmission tube was tested by coupling a halogen lamp of 20 W as the light source with the tube so that light entered the tube from one end face. Light emerged from the tube along an elongated area of the other side surface of the tube opposed to the reflecting layer. The luminance of light was measured on the other side of the tube, using a calorimeter CS100 (Minolta K.K.). Measurement was made along the length of the tube at distances of 10 cm, 20 cm, 30 cm and 40 cm from the light incident end face of the tube. The results are shown in Table 1.

For comparison purposes, an optical transmission tube was similarly prepared by filling the FEP tube with the monomer solution free of the particles and polymerizing the monomer solution. The tube was similarly measured for side luminance. The results are shown in Table 1.

TABLE 1

| | Dispersed particles | | Side luminance (cd/m$^2$) at a distance from the incident end | | | |
|---|---|---|---|---|---|---|
| | Type | Amount (pbw) | 10 cm | 20 cm | 30 cm | 40 cm |
| Comparative Example | — | 0 | 65 | 19 | 12 | 11 |
| Example | Polystyrene particles | 0.15 | 620 | 410 | 310 | 205 |
| | Silicone particles | 0.15 | 613 | 422 | 380 | 265 |

It is evident from Table 1 that as compared with the comparative tube without a reflecting layer, the tubes having a reflecting layer formed therein as a result of addition of scattering particles to a monomer solution allow light to emerge from the side surface at a higher luminance. In the inventive tubes, the luminance is kept high even at distances remote from the light source, that is, the luminance distribution has a gentle slope.

Example 2

The optical transmission tube prepared as in Example 1 was measured for side luminance using a red LED lamp light source (applied voltage 2V, current 20 mA, 0.04 W). The results are shown in Table 2.

A reflective tape (adhesive tape) of vinyl chloride resin loaded with a white pigment was attached to the one side surface of the cladding of the tube to surround the reflecting layer. This tube was also measured for side luminance, with the results shown in Table 2.

TABLE 2

| | Dispersed particles | | Side luminance (cd/m$^2$) at a distance from the incident end | | |
|---|---|---|---|---|---|
| | Type | Amount (pbw) | 5 cm | 12 cm | 20 cm |
| Comparative Example | — | 0 | 3.3 | 1.0 | 0.4 |
| Example | Silicone particles | 0.5 | 10.2 | 10.0 | 9.6 |
| | Silicone particles+ reflective tape | 0.5 | 16.8 | 16.5 | 16 |

It is evident from Table 2 that the tubes within the scope of the invention provide a high side luminance and the attachment of reflective tape improves the luminance. As compared with the tubes of Example 1 using the halogen lamp of 20 W, the tubes of this Example produce a lower overall luminance level since the LED used therein is operated with a power of 0.04 W.

Example 3

A multi-color extruder having three screw sections and capable of co-extruding three materials was used. The core material used is shown in Table 3, the cladding material used was an acrylic polymer, and the reflecting material used was the same as the cladding material in which 15% by weight of titanium oxide was dispersed. The core material, cladding material, and reflecting material were simultaneously fed into the extruder from its inlet and extruded through concentric dies. The core material was extruded into a cylindrical rod having a diameter of 6 mm.

The reflecting material was extruded into an axially extending strip having a transverse width of about 1.5 mm and a radial thickness of 0.01 to 0.02 mm on the outer surface of the cylindrical rod, the strip serving as a white reflecting layer. The cladding material was extruded into a tubular cladding enclosing the rod and the strip and having an outer diameter of 6.5 mm. There was obtained a cylindrical light tube.

This tube was measured for side luminance as in Example 1, with the results shown in Table 3. Comparative Example shown in Table 3 is the same as above.

TABLE 3

|  | Core | Side luminance (cd/m$^2$) at a distance from the incident end | | | |
|---|---|---|---|---|---|
|  |  | 10 cm | 20 cm | 30 cm | 40 cm |
| Comparative Example | Acrylic polymer | 65 | 19 | 12 | 11 |
| Example | Polystyrene | 590 | 370 | 270 | 180 |
|  | Polycarbonate | 510 | 340 | 230 | 140 |
|  | Styrene-acrylate copolymer | 450 | 310 | 200 | 105 |

Styrene-acrylate copolymer: Styrene/methyl methacrylate 30/70 (weight ratio) copolymer

Example 4

The optical transmission tubes prepared as in Example 3 were measured for side luminance using a red LED lamp light source (applied voltage 2V, current 20 mA, 0.04 W). The results are shown in Table 4.

TABLE 4

|  | Core | Side luminance (cd/m$^2$) at a distance from the incident end | | |
|---|---|---|---|---|
|  |  | 5 cm | 12 cm | 20 cm |
| Comparative Example | Acrylic polymer | 3.3 | 1.0 | 0.4 |
| Example | Polystyrene | 9.7 | 9.0 | 8.5 |
|  | Polycarbonate | 9.2 | 8.6 | 8.1 |
|  | Styrene-acrylate copolymer | 8.6 | 7.8 | 7.5 |

Example 5

The optical transmission tubes obtained in Example 3 were examined for the presence or absence of air between the layers and separation between the layers before and after a thermal shock test of rapidly cooling from 70° C. to −30° C. and then rapidly heating from −30° C. to 70° C. Visual observation was made by passing light through the tubes.

In all the tubes, neither air bubbles nor separation between the layers was found before and after the thermal shock test. A close bond between the layers was confirmed.

Example 6

The optical transmission tube used herein was the tube of 30 cm long having a reflecting layer of silicone resin particles obtained in Example 1. A mirror finished stainless steel disc having a thickness of 1 mm and a diameter of 6 mm was joined to one end face of the tube with a clear epoxy adhesive as a reflecting plate. A green light emitting LED NSPG50 (by Nichia Chemical K.K.) was coupled to the other end face of the tube using an aluminum joint. Lead conductors were soldered to terminals of the LED while the connection zone was covered with a silicone rubber adhesive to provide a water-proof seal. A linear illuminant element (Example 6A) was constructed in this way.

A comparative linear illuminant element was similarly constructed using the tube of Comparative Example in Example 1.

A current flow of 20 mA was conducted from a power supply to the LED whereby light emerged from the side area of the tube. The tube was measured for side luminance as in Example 1. Measurement was made along the length of the tube at distances of 50 mm, 150 mm, and 250 mm from the light incident end face of the tube. The results are shown in Table 5. The element of Example 6A produced a higher luminance than the comparative element. The power consumption was 0.06 W.

The linear illuminant element was immersed in water for 6 months. Even after water immersion, the element could be operated to provide the same light emission as the initial element without current leakage and other problems.

A linear illuminant element (Example 6B) was similarly constructed except that a channel as shown at 15 or 16 in FIG. 8 or 9 was formed from a highly reflective resin Banlite LD-1000R (Teijin K.K.) and the optical transmission tube was fitted into the channel. The channel itself was reflective. The tube was measured for side luminance as in Example 1, with the results shown in Table 5.

TABLE 5

|  | Side luminance (cd/m$^2$) at a distance from the incident end | | |
|---|---|---|---|
|  | 50 mm | 150 mm | 250 mm |
| Example 6A | 120 | 100 | 100 |
| Example 6B | 200 | 180 | 175 |
| Comparative Example | 20 | 10 | 10 |

As is evident from Table 5, the tube of Example 6B having the reflective protective layer 14 in the form of a channel produced the highest side luminance, the tube of Example 6A having the reflecting layer 13 produced a high side luminance, and the tube of Comparative Example without the reflecting layer 13 and the reflective protective layer 14 produced the lowest side luminance.

Referring to FIGS. 10 to 18, the application of the linear illuminant element or system is described.

Figure 10:
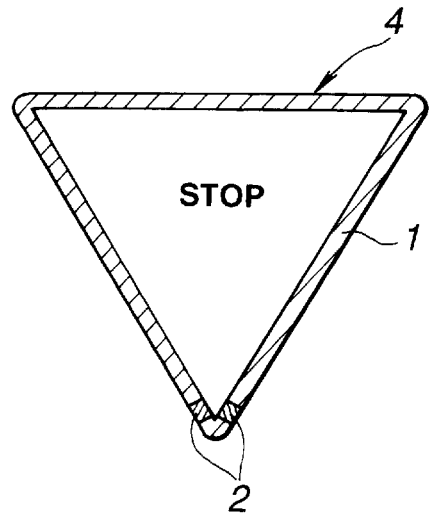
FIG. 10 illustrates a sign to which the linear illuminant system of the invention is applied.

In FIG. 10, the optical transmission tube 1 of the linear illuminant system is extended along the peripheral sides of a sign board 4. The sign board with such an illuminant molding contributes to safety driving at night.

Figure 11:
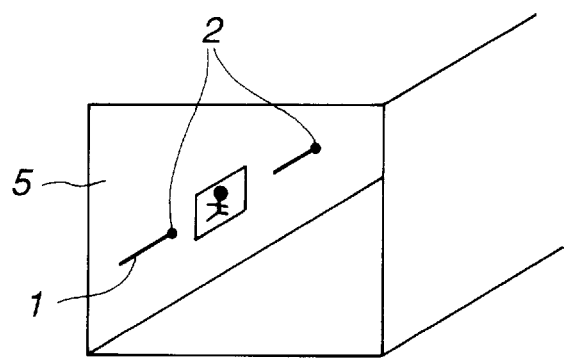
FIG. 11 illustrates the linear illuminant system of the invention as applied to a guide passage.

In FIG. 11, the optical transmission tubes 1 are attached to a side wall 5 of a tunnel. Equivalent objects include underground passages, corridors in buildings and hospitals, and emergency paths in public facilities such as theaters and halls. In this application, a commercial power supply may be used as the drive means for the light source. A provision is made such that upon a power failure, the light source can be driven by a battery. As opposed to incandescent lamps and fluorescent lamps which can be burned with batteries for a time as short as several ten minutes, the LED used as the light source is expected to provide a far longer time of operation even when operated by a battery. The linearity of light emission instructs a safe smooth guide to people because the guidance path is ascertainable by an instant look.

Figure 12:
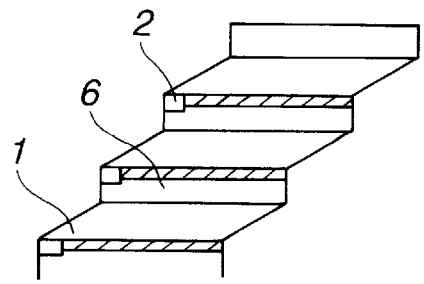
FIG. 12 illustrates the linear illuminant system of the invention as applied to a stairway.

In FIG. 12, the optical transmission tubes 1 are extended along the upper edges of upright walls 6 of a stairway for preventing an accident by misstep at night. When the tubes are attached to an emergency stairway, the stairway can be readily ascertained upon emergency at night, contributing to safe evacuation guidance.

Figure 13:
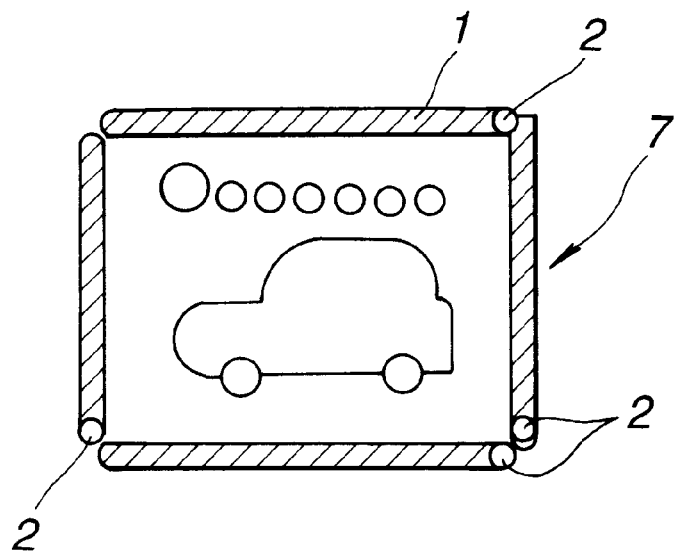
FIG. 13 illustrates the linear illuminant system of the invention as applied to a panel.
Figure 14:
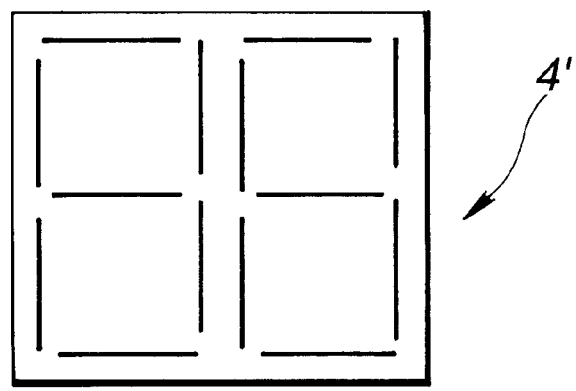
FIG. 14 illustrates the linear illuminant system of the invention as applied to a segmented display board.

In FIG. 13, the optical transmission tubes 1 are extended along the peripheral sides of an advertising board 7. FIG. 14 shows a segmented display panel 4' for indicating the maximum speed. For each digit, seven tubes are combined such that selected ones may be operated while the remaining ones are extinct. This enables variable indication of the speed limit. By increasing the number of segments, a character or modified display is possible.

Figure 15:
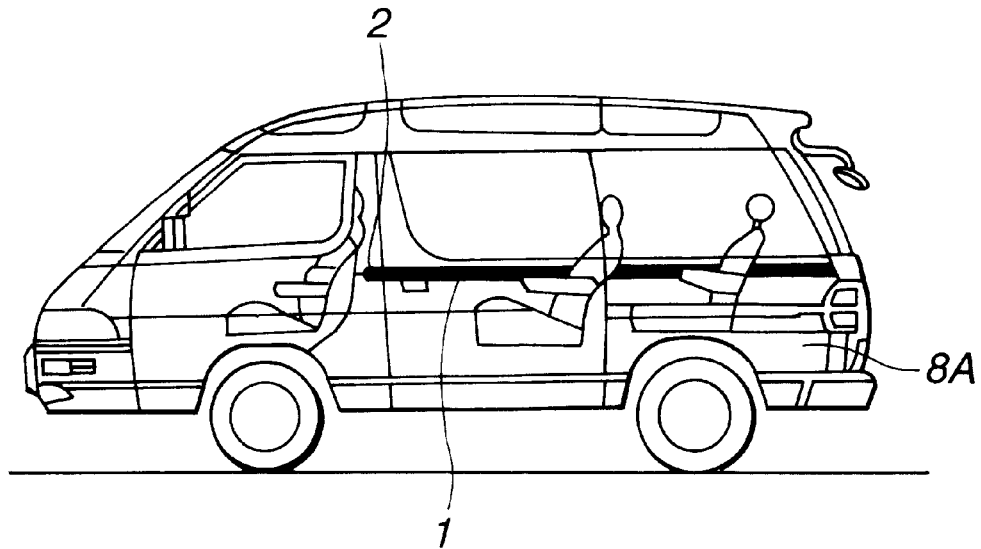
FIG. 15 illustrates the linear illuminant system of the invention as applied to a vehicle interior.
Figure 16:
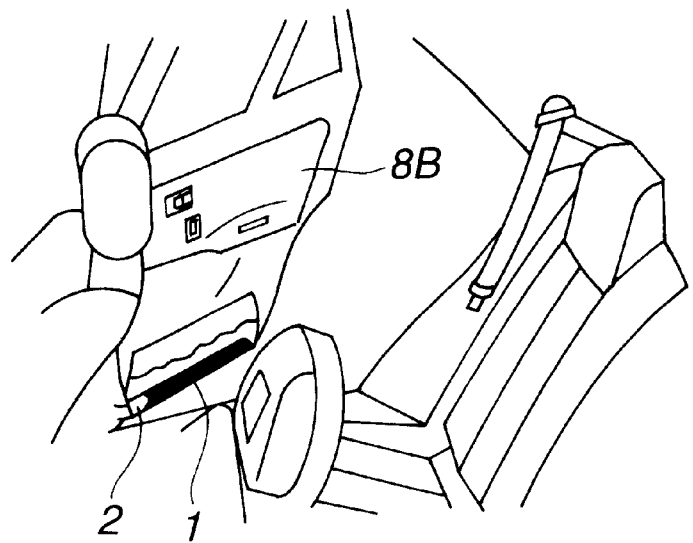
FIG. 16 illustrates the linear illuminant system of the invention as applied to a vehicle door.
Figure 17:
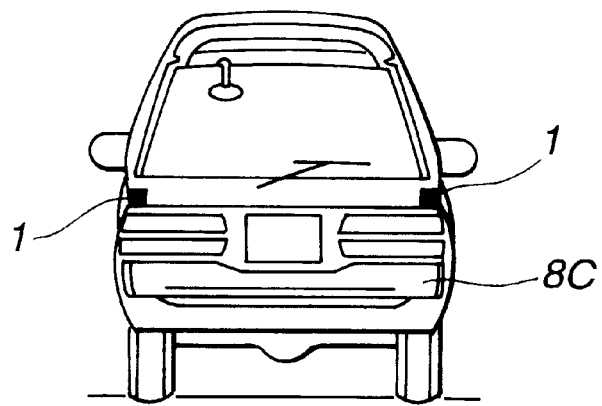
FIG. 17 illustrates the linear illuminant system of the invention as applied to the vehicle rear side as side lights.
Figure 18:
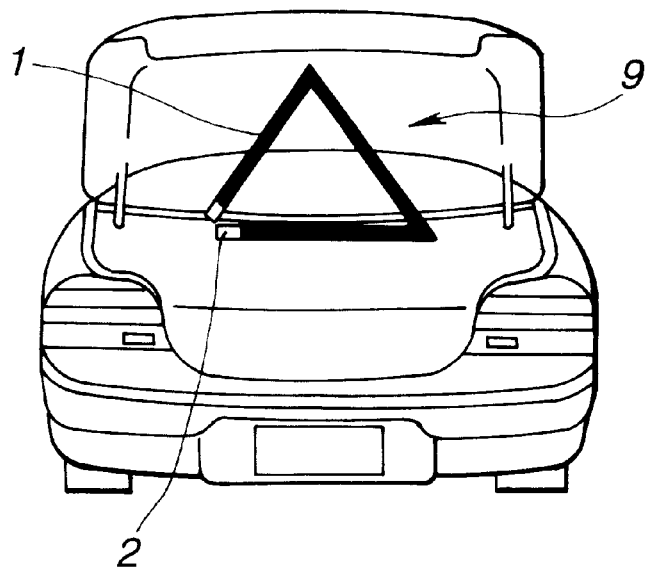
FIG. 18 illustrates the linear illuminant system of the invention as applied to a stop sign attached to a vehicle trunk.

The invention is also applicable to automobiles. In FIG. 15, the optical transmission tube 1 is extended along the side of a vehicle interior 8A for providing indirect illumination. In FIG. 16, the optical transmission tube 1 is attached to a lower portion of the inner wall of a door 8B, serving as a foot light. In FIG. 17, the optical transmission tubes 1 are attached to the rear side 8C of a vehicle, serving as side lights. In FIG. 18, the optical transmission tube 1 is extended along the sides of a triangular emergency stop sign 9 which is used to inform the following drivers of the emergency stop of the car on the road.

In addition to the foregoing examples, the linear illuminant element or system of the invention may find many other applications including (1) luminous nameplates, (2) guide poles used at night work, (3) luminous sticks, (4) luminous swords as sporting gears and toys, (5) warning lights suspended from tent ropes for warning against stumbling at night, (6) displays in aquariums, (7) course indicators and decorative lights in pools, (8) buoys, piers, banks and marine hoses (for providing improved visibility), (9) crossing gates, and (10) safety displays providing linear luminous bands for indicating crossing stop lines and the height limit of overhead beams or parking inlets.

Although some preferred embodiments have been described, many modifications and variations may be made thereto in light of the above teachings. It is therefore to be understood that the invention may be practiced otherwise than as specifically described without departing from the scope of the appended claims.

We claim:

1. An optical transmission tube comprising
   a tubular cladding having an outer surface,
   a core within the cladding having a higher index of refraction than said cladding, and
   a reflecting layer in a strip form extending between said cladding and said core and longitudinally of said cladding,
   wherein light passing through said core is reflected and scattered by the reflecting layer to emerge from the tube through an area of the outer surface of said cladding opposed to the reflecting layer.

2. The optical transmission tube of claim 1 wherein said reflecting layer is comprised of scattering particles.

3. The optical transmission tube of claim 1 further comprising a reflective protective layer disposed on an area of the outer surface of said cladding surrounding the reflecting layer.

4. The optical transmission tube of claim 1 wherein said cladding is constructed of a fluorinated polymer and said core is constructed of an acrylic polymer.

5. The optical transmission tube of claim 1 wherein said cladding is constructed of a (meth)acrylic polymer, said core is constructed of polystyrene, polycarbonate or a styrene-(meth)acrylate copolymer, and said reflecting layer is constructed of a (meth)acrylic polymer loaded with a white pigment or scattering agent.

6. A method for preparing an optical transmission tube, comprising the steps of:
   dispersing scattering particles in a core-forming solution comprising a monomer capable of forming a core upon polymerization,
   filling a tubular cladding with the scattering particle-dispersed core-forming solution,
   resting the tubular cladding horizontally for allowing the scattering particles to settle on a lower inner surface of the cladding, and
   thereafter, causing the core-forming solution to polymerize and solidify within said cladding, thereby forming a solid core within said cladding and forming a reflecting layer composed of the scattering particles in a strip form extending between said cladding and said core and longitudinally of said cladding.

7. The method of claim 6 further comprising the step of forming a reflective protective layer on an area of the outer surface of said cladding surrounding the reflecting layer.

8. The method of claim 6 wherein said cladding is constructed of a fluorinated polymer and said core is constructed of an acrylic polymer.

9. A method for preparing an optical transmission tube using a three-color extruder having three screw sections, comprising the steps of:
   simultaneously feeding a core material, a cladding material, and a reflecting material loaded with a white pigment or scattering agent into the extruder, and
   extruding the core material into a cylindrical core, extruding the reflecting material into a strip-shaped reflecting layer on the outer surface of the cylindrical core, and extruding the cladding material into a tubular cladding enclosing the core and the reflecting strip, thereby forming the optical transmission tube having the strip-shaped reflecting layer extending between the cladding and the core and longitudinally of the cladding.

10. The method of claim 9 wherein said cladding is constructed of a (meth)acrylic polymer, said core is constructed of polystyrene, polycarbonate or a styrene-(meth)acrylate copolymer, and said reflecting layer is constructed of a (meth)acrylic polymer loaded with a white pigment.

11. A linear illuminant system comprising
    a light transmission tube including a transparent core and a cladding having a lower index of refraction than the core, and serving as a light emergent element,
    a reflecting layer in a strip form extending between said cladding and said core and longitudinally of said cladding,
    a light source coupled to at least one end of said light transmission tube in a water-proof manner, and
    a drive means for operating the light source,
    wherein said light transmission tube is constructed such that when light emitted from the light source is transmitted by said light transmission tube, light emerges from a longitudinal side of said light transmission tube.

* * * * *